US010148593B2

(12) United States Patent
Kodi et al.

(10) Patent No.: US 10,148,593 B2
(45) Date of Patent: Dec. 4, 2018

(54) DIRECTIONAL ALLOCATION OF COMMUNICATION LINKS BASED ON DATA TRAFFIC LOADS

(71) Applicants: Arizona Board of Regents on Behalf of the University of Arizona, Tuscon, AZ (US); OHIO UNIVERSITY, Athens, OH (US)

(72) Inventors: Avinash Karanth Kodi, Athens, OH (US); Dominic Ditomaso, Athens, OH (US); Ahmed Louri, Tuscon, AZ (US)

(73) Assignees: Ohio University, Athens, OH (US); Arizona Board of Regents on Behalf of the University of Arizona, Tuscon, AZ (US)

( * ) Notice: Subject to any disclaimer, the term of this patent is extended or adjusted under 35 U.S.C. 154(b) by 0 days.

(21) Appl. No.: 15/118,823

(22) PCT Filed: Feb. 13, 2015

(86) PCT No.: PCT/US2015/015926
§ 371 (c)(1),
(2) Date: Aug. 12, 2016

(87) PCT Pub. No.: WO2015/123584
PCT Pub. Date: Aug. 20, 2015

(65) Prior Publication Data
US 2017/0048166 A1    Feb. 16, 2017

Related U.S. Application Data

(60) Provisional application No. 61/940,035, filed on Feb. 14, 2014.

(51) Int. Cl.
*H04L 12/933* (2013.01)
*H04L 12/931* (2013.01)

(52) U.S. Cl.
CPC ............ *H04L 49/109* (2013.01); *H04L 49/50* (2013.01)

(58) Field of Classification Search
None
See application file for complete search history.

(56) References Cited

U.S. PATENT DOCUMENTS

| | | | |
|---|---|---|---|
| 7,882,307 B1 * | 2/2011 | Wentzlaff ............ | G06F 12/0813 711/119 |
| 2003/0120739 A1 | 6/2003 | Garney et al. | |
| 2011/0064087 A1 | 3/2011 | Lan et al. | |

OTHER PUBLICATIONS

International Search Report for PCT/US2015/015926 dated Jul. 31, 2015.

* cited by examiner

*Primary Examiner* — Kouroush Mohebbi
(74) *Attorney, Agent, or Firm* — Wood Herron & Evans LLP

(57) ABSTRACT

A first example provides a circuit configured to operate in four modes. A first mode includes propagating data from a first terminal of the circuit to a second terminal of the circuit. A second mode includes propagating data from the second terminal of the circuit to the first terminal of the circuit. A third mode includes storing data received by the first terminal. A fourth mode includes storing data received by the second terminal. A second example provides a circuit configured to cause one or more communication links to operate in one of two modes based on data traffic detected on the one or more communication links. The first mode includes propagating data from a first router to a second router. The second mode includes propagating data to the first router from the second router.

16 Claims, 12 Drawing Sheets

DIRECTIONAL ALLOCATION OF COMMUNICATION LINKS BASED ON DATA TRAFFIC LOADS

CROSS-REFERENCE TO RELATED APPLICATION

This application is a U.S. national phase of International Application No. PCT/US2015/015926, filed on Feb. 13, 2015, which claims priority to U.S. Provisional Application No. 61/940,035, filed Feb. 14, 2014, both of which are incorporated by reference herein in their entirety.

STATEMENT REGARDING FEDERALLY SPONSORED RESEARCH OR DEVELOPMENT

This invention was made with government support under Grant Nos. CNS1342984, ECCS0725765, CCF0915537, CCF1054339, ECCS1129010, CNS1318981, ECCS1342657, ECCS 1342702, CNS1318997, and CCF1420718 awarded by the National Science Foundation (NSF). The government has certain rights in the invention.

BACKGROUND

Unless otherwise indicated herein, the materials described in this section are not prior art to the claims in this application and are not admitted to be prior art by inclusion in this section.

Various methods and circuits exist for managing data traffic between routers of a network-on-chip architecture. For example, a first router and a second router may communicate via one or more unidirectional communication links. That is, a first set of communication links may be hard-wired to transmit data from the first router to the second router, while a second set of communication links may be hard-wired to transmit data from the second router to the first router. A communication network for numerous routers may be implemented in this way.

SUMMARY

In one example, a circuit comprises a first terminal and a second terminal, a storage module, and a control module. The control module is configured to cause the circuit to operate in a first mode based on the control module receiving a control signal corresponding to the first mode. Operating in the first mode comprises propagating data received by the first terminal to the second terminal. The control module is further configured to cause the circuit to operate in a second mode based on the control module receiving a control signal corresponding to the second mode. Operating in the second mode comprises propagating data received by the second terminal to the first terminal. The control module is further configured to cause the circuit to operate in a third mode based on the control module receiving a control signal corresponding to the third mode. Operating in the third mode comprises the storage module storing data received by the first terminal. The control module is further configured to cause the circuit to operate in a fourth mode based on the control module receiving a control signal corresponding to the fourth mode. Operating in the fourth mode comprises the storage module storing data received by the second terminal.

In another example, a method performed by a circuit comprises, based on receiving a first control signal, propagating data received by a first terminal of the circuit to a second terminal of the circuit. The method further comprises, based on receiving a second control signal, propagating data received by the second terminal to the first terminal. The method further comprises, based on receiving a third control signal, storing data received by the first terminal. The method further comprises, based on receiving a fourth control signal, storing data received by the second terminal.

In yet another example, a method is provided for controlling one or more communication links that communicatively couple a first router of a network-on-chip architecture and a second router of the network-on-chip architecture. The method comprises making a determination of whether, during a given time period, a first amount of data sent by the first router via the one or more communication links is greater than a second amount of data received by the first router via the one or more communication links. The method further comprises, based at least in part on the determination: causing a communication link of the one or more communication links to switch from operating in a first mode to operating in a second mode or causing the communication link to switch from operating in the second mode to operating in the first mode. Operating in the first mode comprises propagating data from the first router to the second router and operating in the second mode comprises propagating data to the first router from the second router.

In yet another example, a circuit of a network-on-chip architecture comprises a first router, a second router, and one or more communication links that communicatively couple the first router and the second router. The circuit is configured to perform functions that comprise the first router making a determination of whether, during a given time period, a first amount of data sent by the first router via the one or more communication links is greater than a second amount of data received by the first router via the one or more communication links. The functions further comprise, based at least in part on the determination, a communication link of the one or more communication links switching from operating in a first mode to operating in a second mode or the communication link switching from operating in the second mode to operating in the first mode. Operating in the first mode comprises propagating data from the first router to the second router and operating in the second mode comprises propagating data to the first router from the second router.

These as well as other aspects, advantages, and alternatives, will become apparent to those of ordinary skill in the art by reading the following detailed description, with reference where appropriate to the accompanying drawings.

DETAILED DESCRIPTION

As noted above, a network that communicatively couples routers of a network-on-chip architecture may be implemented via unidirectional communication links. However, if all unidirectional communication links that are hard-wired to transmit data from a first router to a second router fail (e.g., exhibit a fault), a network failure may occur. To help alleviate this problem, multi-function buffer circuits (MFBCs) and reversible communication links comprised of MFBCs are disclosed herein.

Figure 1:
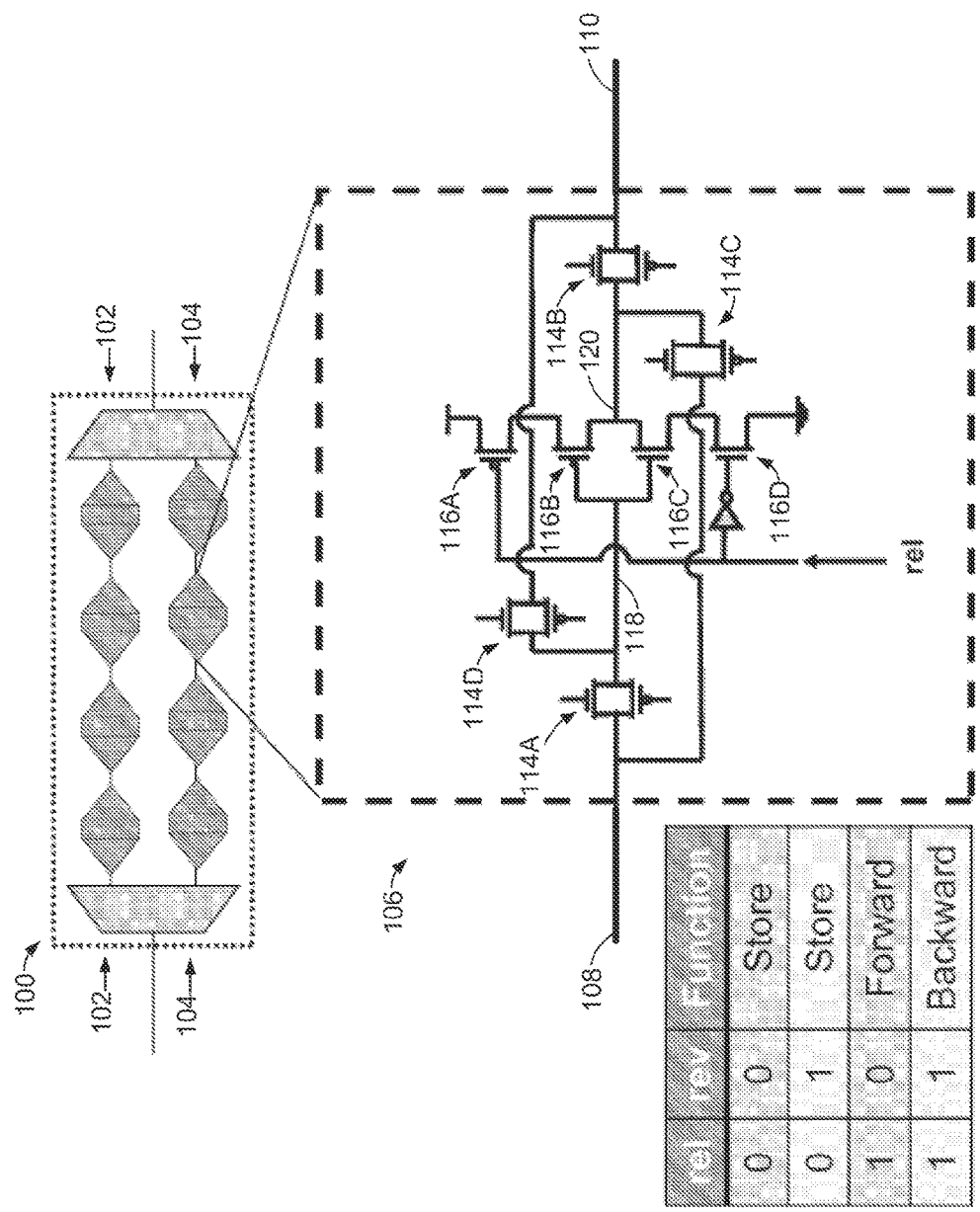
FIG. 1 illustrates an example communication link that includes several multi-function channel buffer circuits.

FIG. 1 illustrates an example communication link 100 that includes two buffer channels 102 and 104. In some examples, the communication link 100 may communicatively couple a first router and a second router, as discussed below in reference to FIG. 3 and FIG. 5. When the first router or the second router is experiencing data congestion, the communication link 100 may also be used to store data that is in transit between the first router and the second router. Each of the buffer channels 102 and 104 include four MFBCs 106 connected in series. It should be noted that in examples other than that of FIG. 1, a communication link may include any number of buffer channels. Similarly, in examples other than that of FIG. 1, buffer channels may include any number of multi-function buffers.

Each MFBC 106 includes a first terminal 108, a second terminal 110, four switches 114A, 114B, 114C, and 114D, and a three-state buffer. The three-state buffer includes four switches 116A, 116B, 116C, and 116D, an input terminal 118, and an output terminal 120 that may also be referred to herein as a storage module. The switches 114A-D, 116A and 116D may also be collectively referred to herein as a control module. In one example, the switches 114A-D may be implemented as transmission gates and the switches 116A-D may be implemented as field-effect transistors (FETs), but other examples are possible and will be known to those of skill in the art.

The switches 114A-D may each be configured to receive a "reverse" or "rev" control signal. Similarly, the switches 116A and 116D may each be configured to receive a "release" or "rel" control signal. The switches 114A-D, 116A, and 116D receiving various combinations of the "rev" and "rel" signals may cause the MFBC 106 to switch between operating in one of four modes.

Figure 2A:
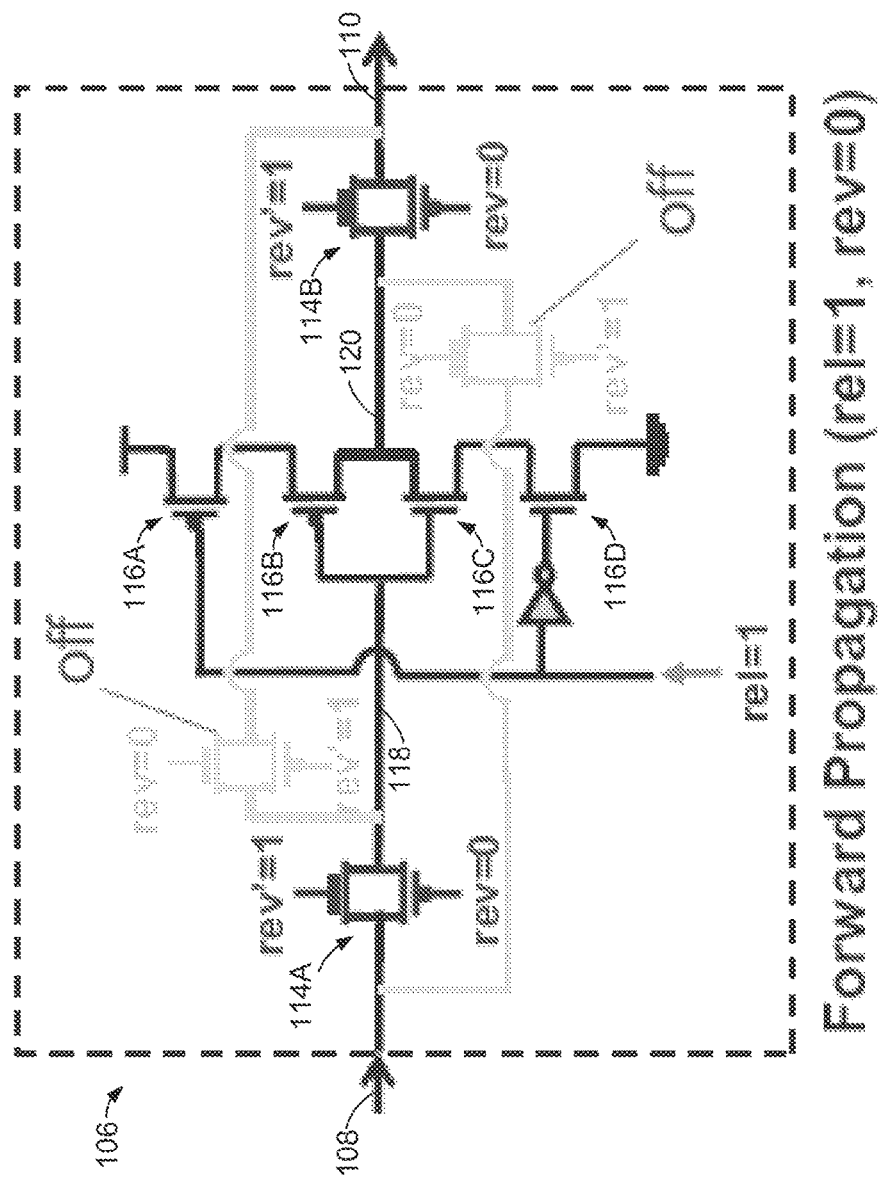
FIG. 2A illustrates a first mode of operation for a multi-function channel buffer circuit.

As shown in FIG. 2A, the MFBC 106 may operate in a first mode (e.g., "forward propagation") when the switches 114A-D receive a "rev" control signal of logic 0 (low) and the switches 116A and 116D receive a "rel" control signal of logic 1 (high). Based on receiving the "rev=0" control signal, the switches 114A and 114B are closed and the switches 114C and 114D are open. (In FIG. 2A, the switches 114C and 114D from FIG. 1 are shown in a lighter font, to emphasize that they are "off" or open.) The closed switch 114A creates a conductive path between the first terminal 108 and the input terminal 118, and the closed switch 114B creates a conductive path between the output terminal 120 and the second terminal 110. Therefore, data received at the first terminal 108 may be propagated from the first terminal 108 to the input terminal 118. Also, data at the output terminal 120 may be propagated to the second terminal 110. Based on receiving the "rel=1" signal, the switches 116A and 116D are closed, enabling data provided at the input terminal 118 to be propagated to the output terminal 120. To summarize, the first mode involves data provided at the first terminal 108 being propagated to the input terminal 118, then to the output terminal 120, then to the second terminal 110, and perhaps thereafter to another MFBC or another circuit.

Figure 2B:
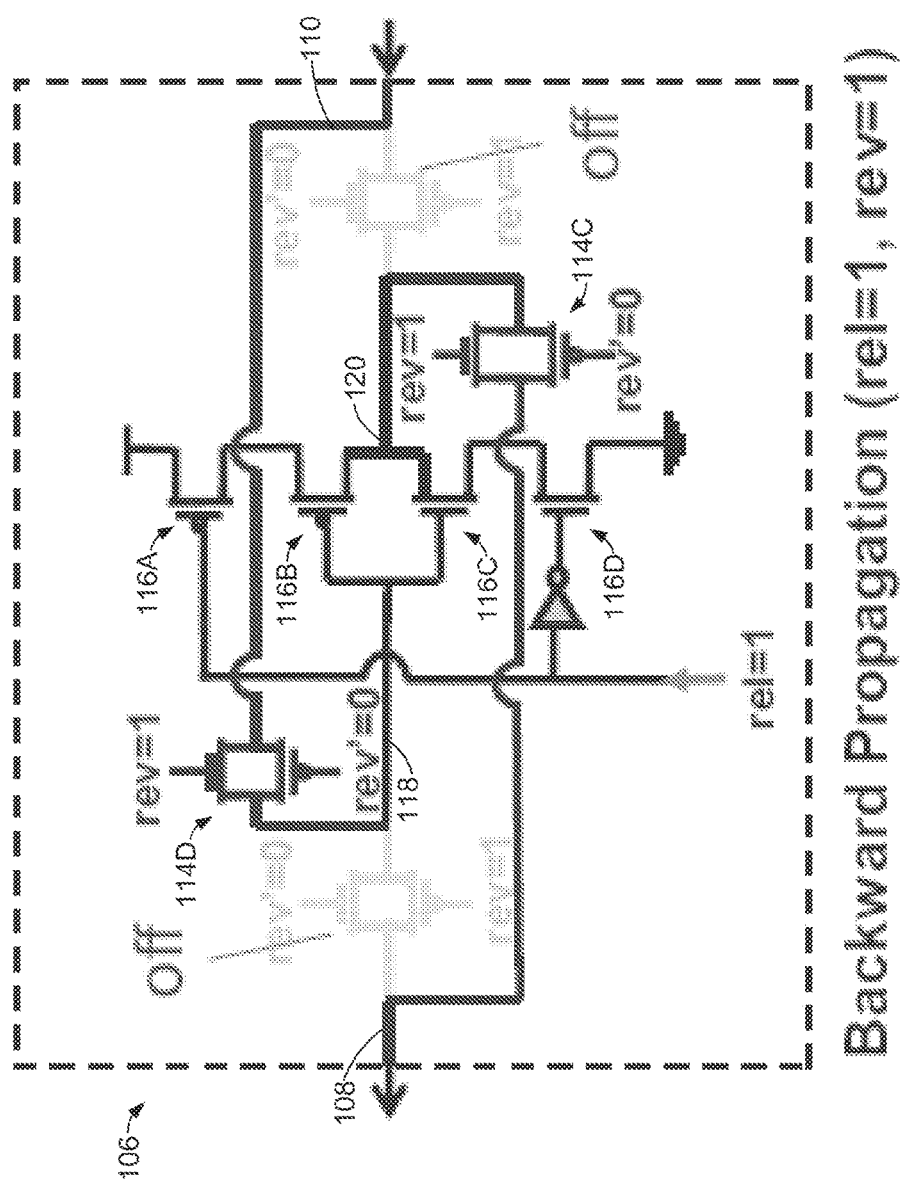
FIG. 2B illustrates a second mode of operation for a multi-function channel buffer circuit.

As shown in FIG. 2B, the MFBC 106 may operate in a second mode (e.g., "backward propagation") when the switches 114A-D receive a "rev=1" control signal and the switches 116A and 116D receive a "rel=1" signal. Based on receiving the "rev=1" control signal, the switches 114A and 114B are open and the switches 114C and 114D are closed. (In FIG. 2B, the switches 114A and 114B from FIG. 1 are shown in a lighter font, to emphasize that they are "off" or open.) The closed switch 114C creates a conductive path between the first terminal 108 and the output terminal 120, and the closed switch 114D creates a conductive path between the input terminal 118 and the second terminal 110. Therefore, data received at the second terminal 110 may be propagated from the second terminal 110 to the input terminal 118. Also, data at the output terminal 120 may be propagated to the first terminal 108. Based on receiving the "rel=1" signal, the switches 116A and 116D are closed, enabling data provided at the input terminal 118 to be propagated to the output terminal 120. To summarize, the second mode involves data provided at the second terminal 110 being propagated to the input terminal 118, then to the output terminal 120, then to the first terminal 108, and perhaps thereafter to another MFBC or another circuit.

Figure 2C:
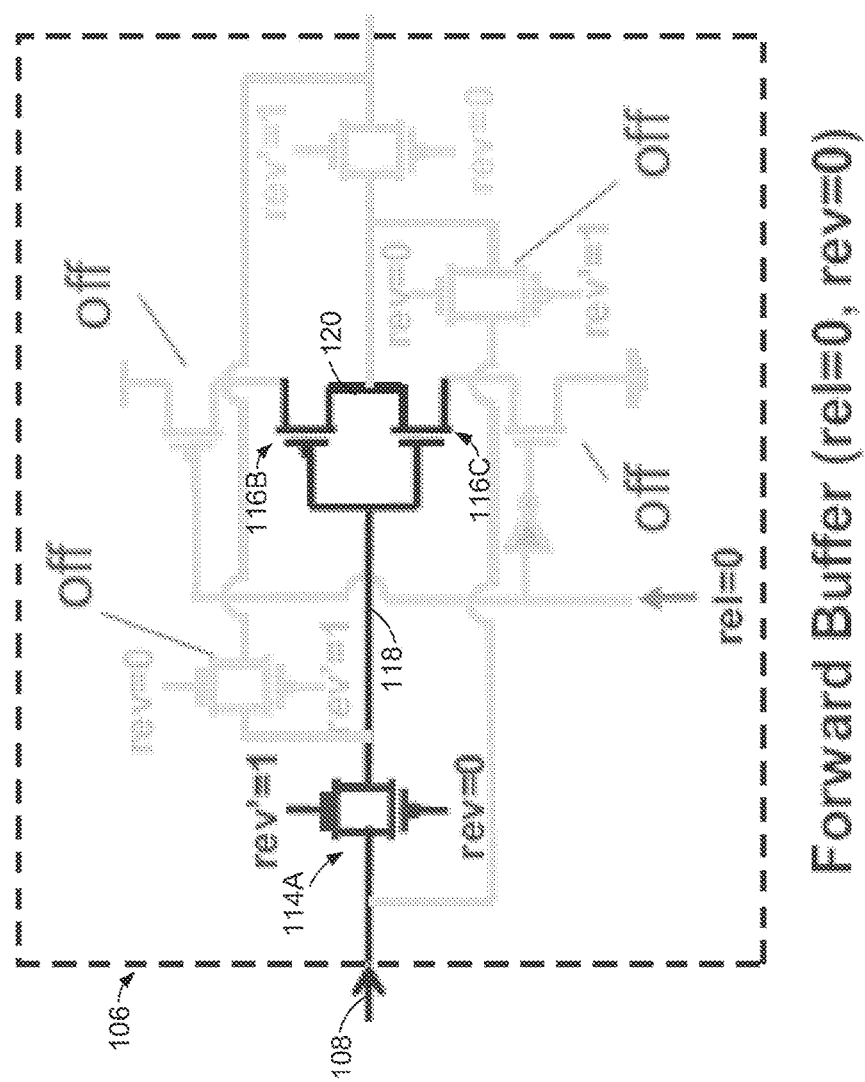
FIG. 2C illustrates a third mode of operation for a multi-function channel buffer circuit.

As shown in FIG. 2C, the MFBC 106 may operate in a third mode (e.g., "forward buffer") when the switches 114A-D receive a "rev=0" control signal and the switches 116A and 116D receive a "rel=0" control signal. Based on receiving the "rev=0" control signal, the switches 114A and 114B are closed and the switches 114C and 114D are open. (In FIG. 2A, the switches 114B, 114C and 114D from FIG. 1 are shown in a lighter font, to emphasize that they are either (i) "off" or open or (ii) do not materially impact the circuit in the third mode.) The closed switch 114A creates a conductive path between the first terminal 108 and the input terminal 118. Therefore, data received at the first terminal 108 may be propagated from the first terminal 108 to the input terminal 118. Based on receiving the "rel=0" signal, the switches 116A and 116D are open, and data previously propagated from the input terminal 118 is stored at the output terminal 120. In short, the third mode involves data present at the input terminal 118 at the time the "rel=0" signal is received by the switches 116A and 116D to be stored at the output terminal 120. While the MFBC 106 remains in the third mode, the output terminal 120 will continue to store the data that was present at the input terminal 118 at the time the "rel=0" signal was received by the switches 116A and 116D.

Figure 2D:
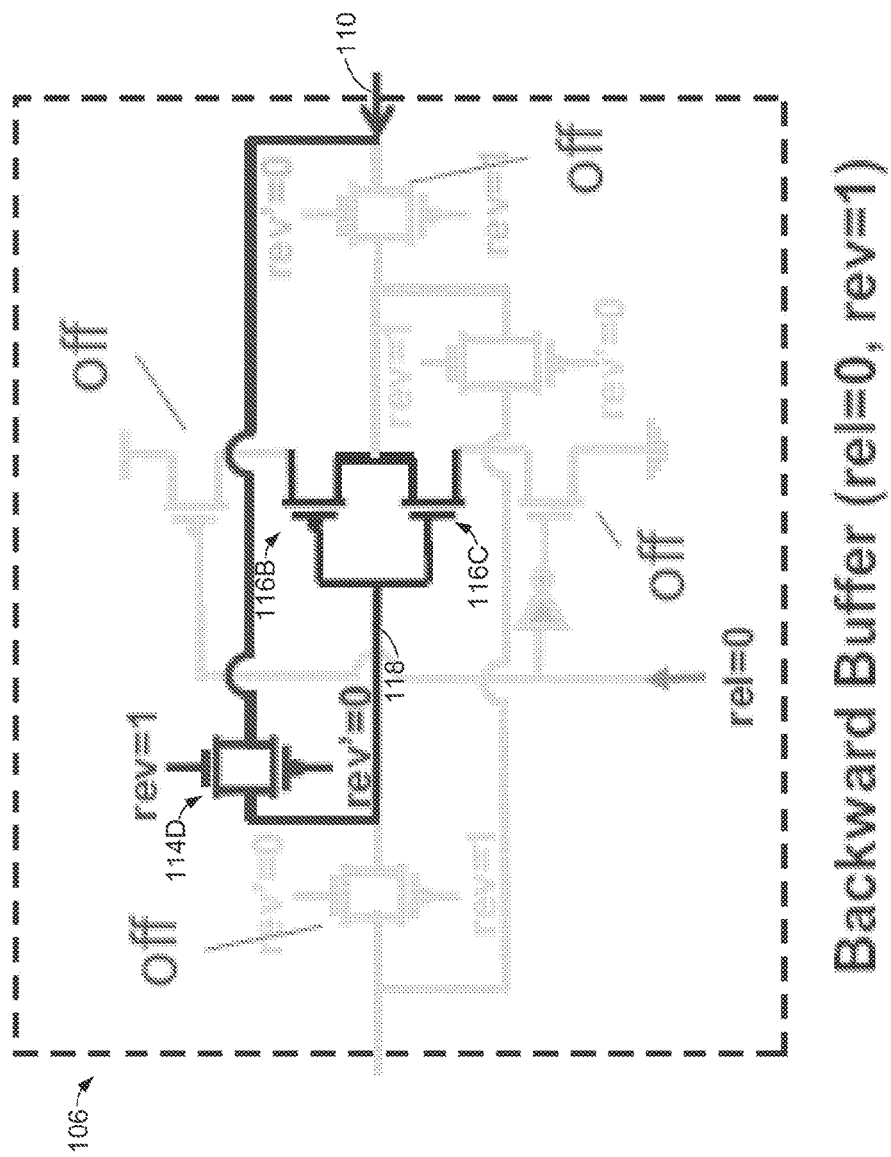
FIG. 2D illustrates a fourth mode of operation for a multi-function channel buffer circuit.

As shown in FIG. 2D, the MFBC 106 may operate in a fourth mode (e.g., "backward buffer") when the switches 114A-D receive a "rev=1" control signal and the switches 116A and 116D receive a "rel=0" control signal. Based on receiving the "rev=1" control signal, the switches 114A and 114B are open and the switches 114C and 114D are closed. (In FIG. 2D, the switches 114A, 114B and 114C from FIG. 1 are shown in a lighter font, to emphasize that they are either (i) "off" or open or (ii) do not materially impact the circuit in the fourth mode.) The closed switch 114D creates a conductive path between the second terminal 110 and the input terminal 118. Therefore, data received at the second terminal 110 may be propagated from the second terminal 110 to the input terminal 118. Based on receiving the "rel=0" signal, the switches 116A and 116D are open, enabling data previously propagated from the input terminal 118 to be stored at the output terminal 120. In short, the fourth mode involves data present at the input terminal 118 at the time the "rel=0" signal is received by the switches 116A and 116D to be stored at the output terminal 120. While the MFBC 106 remains in the fourth mode, the output terminal 120 will continue to store the data that was present at the input terminal 118 at the time the "rel=0" signal is received by the switches 116A and 116D.

It should be noted that, while the discussion above related to FIGS. 1 and 2A-2D refer to two control signals "rev" and "rel," this is by mere arbitrary convention. In other examples, the two control signals "rev" and "rel" may be considered a single two-bit control signal that may indicate any of the four modes. The two control signals "rev" and "rel" may be considered to be a single control signal in other ways as well. This disclosure contemplates any embodiment where the MFBC 106 receives information indicating one of the four modes discussed above and the MFBC 106 operates in the mode indicated by the received information.

Furthermore, the discussion above refers to various switches of a control module reacting in various ways based on whether certain logic 1 (high) or logic 0 (low) control signals are received. One of ordinary skill in the art will recognize that other examples are contemplated herein. As one example, the MFBC 106 may be wired to operate in the fourth mode in response to receiving a "rev=0" control signal and a "rel=1" control signal.

Figure 3:
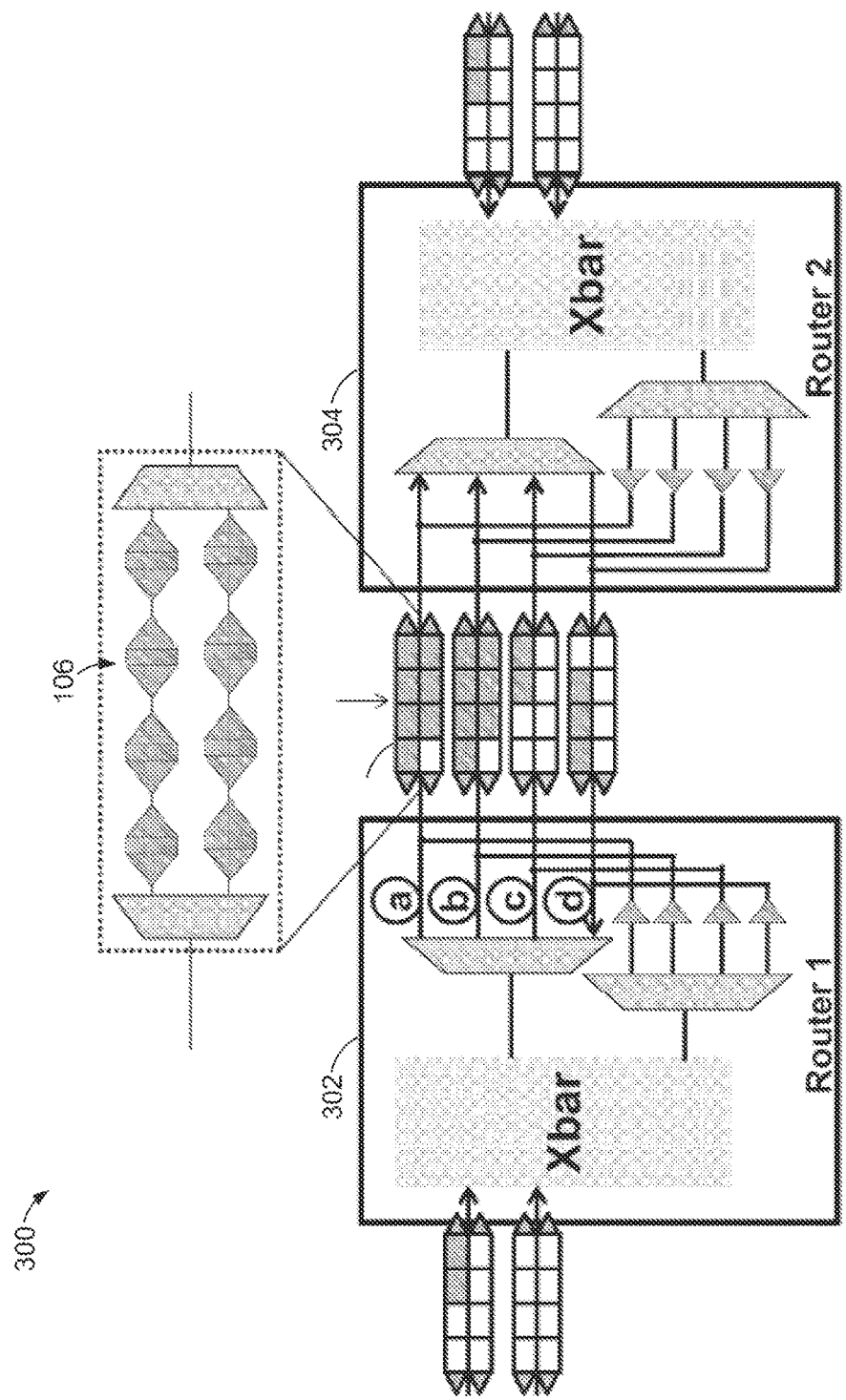
FIG. 3 illustrates example routers of a network-on-chip architecture and example communication links that communicatively couple the routers.

FIG. 3 illustrates a circuit 300 that includes a first router 302, a second router 304, and communication links "a," "b," "c," and "d." The circuit 300 may be included as part of a network-on-chip architecture. For example, the network-on-chip architecture may include at least a first processor (not shown) and a second processor (not shown). The first router 302 may act as an intermediary by routing data from the first processor to the second processor or by routing data from the second processor to the first processor. The second router 304 may similarly act as an intermediary for the second processor.

The first router 302 may include a network of switches referred to as a "crossbar" (abbreviated "xbar" in FIG. 3). The crossbar may be configured to selectively connect any of the communication links a-d with other communication links that connect the first router 302 to other routers. The first router 302 may also be configured to connect any of the communication links a-d with various input or output terminals of the first processor (not shown).

The second router 304 may similarly include a crossbar. The crossbar may be configured to selectively connect any of the communication links a-d with other communication links that connect the second router 304 to other routers. The first router 302 may also be configured to connect any of the communication links a-d with various input or output terminals of the second processor (not shown).

The communication links a-d may each include two buffer channels each comprising four MFBCs. The router 302 or the router 304 may control the communication links a-d to respectively operate in one of two (or possibly more) modes.

Figure 4:
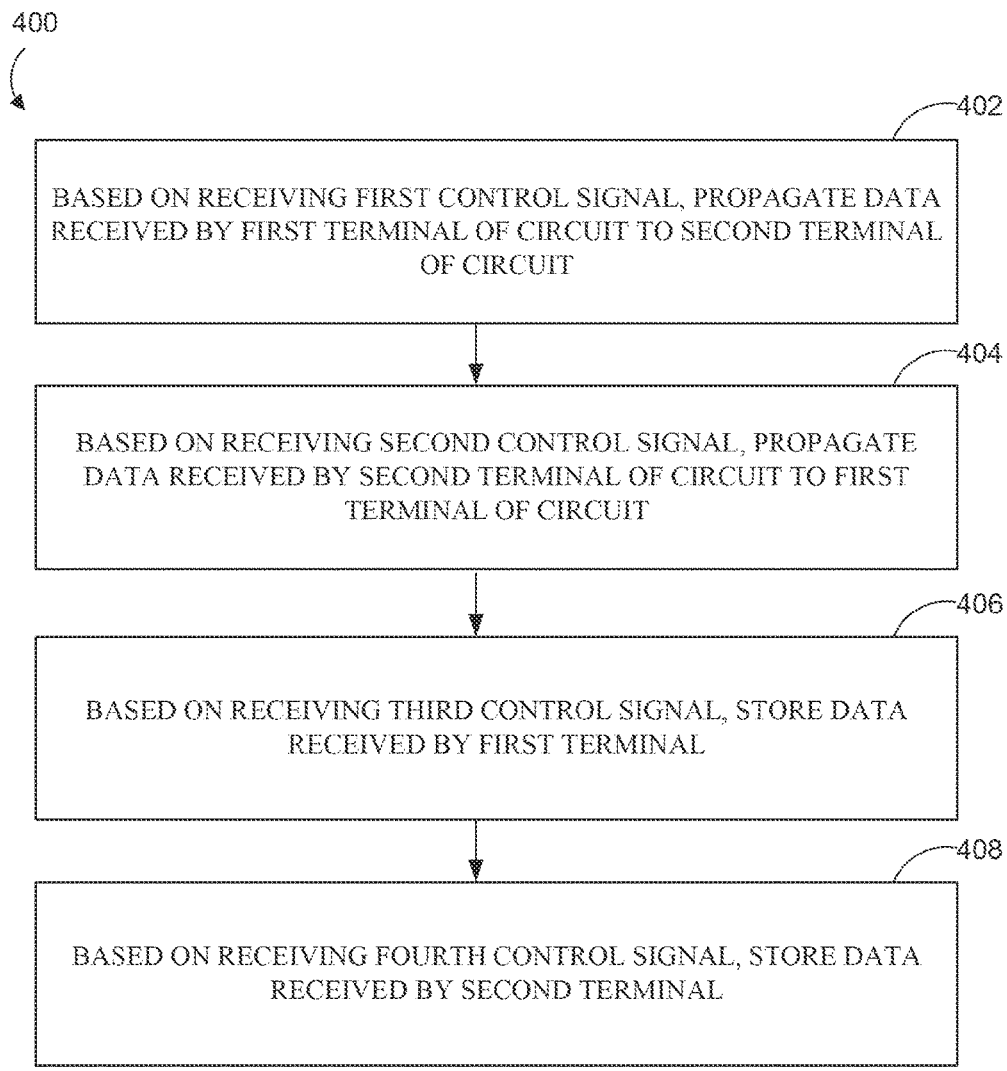
FIG. 4 is a block diagram depicting an example method.

FIG. 4 is a block diagram depicting an example method 400. In some examples, the method 400 is performed by a circuit, such as the MFBC 106 of FIG. 1. At block 402, the method 400 involves, based on receiving a first control signal, propagating data received by a first terminal of the circuit to a second terminal of the circuit. Propagating data received by the first terminal of the circuit to the second terminal of the circuit may also be referred to as operating in a first mode. As described above in relation to FIG. 2A, the first control signal may include a "rev=0" signal and a "rel=1" control signal. In other examples, the first control signal may include any information recognizable by the circuit as corresponding to the first mode, so that based on the circuit receiving the first control signal, the circuit may operate in the first mode.

In some examples, the circuit is part of a communication link that communicatively couples a first router of a network-on-chip architecture with a second router of the network-on-chip architecture. In this context, the method 400 may further involve the first terminal of the circuit receiving first data transmitted by the first router, and based on receiving the first control signal, the second terminal transmitting the first data to the second router.

Referring to FIG. 3 for instance, the MFBC 106 may be included in communication link "a" that communicatively couples the first router 302 and the second router 304. The first router 302 may transmit first data that is received by the first terminal 108 of the MFBC 106. Based on the switches 114A-D receiving the "rev=0" signal and the switches 116A and 116D receiving the "rel=1" signal, the second terminal 110 may transmit the first data to the second router 304.

At block 404, the method 400 involves, based on receiving a second control signal, propagating data received by the second terminal to the first terminal. Propagating data received by the second terminal of the circuit to the first terminal of the circuit may also be referred to as operating in a second mode. As described above in relation to FIG. 2B, the second control signal may include a "rev=1" signal and a "rel=1" control signal. In other examples, the second control signal may include any information recognizable by the circuit as corresponding to the second mode, so that based on the circuit receiving the second control signal, the circuit may operate in the second mode.

The method 400 may further involve the second terminal of the circuit receiving second data transmitted by the second router, and based on receiving the second control signal, the first terminal transmitting the second data to the first router. For example, the second router 304 may transmit second data that is received by the second terminal 110 of the MFBC 106. Based on the switches 114A-D receiving the "rev=1" signal and the switches 116A and 116D receiving the "rel=1" signal, the first terminal 108 may transmit the second data to the first router 302.

At block 406, the method 400 involves based on receiving a third control signal, storing data received by the first terminal. Storing data received by the first terminal may also be referred to as operating in a third mode. As described above in relation to FIG. 2C, the third control signal may include a "rev=0" signal and a "rel=0" control signal. In other examples, the third control signal may include any information recognizable by the circuit as corresponding to the third mode, so that based on the circuit receiving the third control signal, the circuit may operate in the third mode.

The method 400 may further involve the first terminal of the circuit receiving third data transmitted by the first router, and based on receiving the third control signal, a storage module of the circuit storing the third data. For example, based on the switches 114A-D receiving a "rev=0" control signal and the switches 116A and 116D receiving a "rel=0" control signal, the output terminal 120 of the MFBC 106 may store the third data.

At block 408, the method 400 involves, based on receiving a fourth control signal, storing data received by the second terminal. Storing data received by the second terminal may also be referred to as operating in a fourth mode. As described above in relation to FIG. 2D, the fourth control signal may include a "rev=1" signal and a "rel=0" signal. In other examples, the fourth control signal may include any information recognizable by the circuit as corresponding to the fourth mode, so that based on the circuit receiving the fourth control signal, the circuit may operate in the fourth mode.

The method 400 may further involve the second terminal of the circuit receiving fourth data transmitted by the second router, and based on receiving the fourth control signal, the storage module of the circuit storing the fourth data. Based on the switches 114A-D receiving a "rev=1" control signal and the switches 116A and 116D receiving a "rel=0" control signal, the output terminal 120 of MFBC 106 may store the fourth data.

In some examples, the circuit may include a three-stage buffer including an input terminal and an output terminal. In this context, the method 400 may further involve, based on receiving the first control signal: providing a conductive path between the first terminal and the input terminal; and providing a conductive path between the second terminal and the output terminal. For instance, the MFBC 106 may receive control signals "rev=0" and "rel=1," and in response the switch 114A may provide a conductive path between the first terminal 108 and the input terminal 118. Also, in response to receiving the control signals "rev=0" and "rel=1," the switch 114B may provide a conductive path between the second terminal 110 and the output terminal 120.

Similarly, the method 400 may involve, based on receiving the second control signal: providing a conductive path between the first terminal and the output terminal; and providing a conductive path between the second terminal and the input terminal. For instance, the MFBC 106 may receive control signals "rev=1" and "rel=1," and in response the switch 114C may provide a conductive path between the first terminal 108 and the output terminal 120. Also, in response to receiving the control signals "rev=1" and "rel=1," the switch 114D may provide a conductive path between the second terminal 110 and the input terminal 118.

The method 400 may also involve, based on receiving the third control signal, electrically isolating the output terminal. For example, the MFBC 106 may receive control signals "rev=0" and "rel=0," and in response the switches 116A and 116D may open to isolate the output terminal 120.

The method 400 may also involve, based on receiving the fourth control signal, electrically isolating the output terminal. For example, the MFBC 106 may receive control signals "rev=1" and "rel=0," and in response the switches 116A and 116D may open to isolate the output terminal 120.

Figure 5:
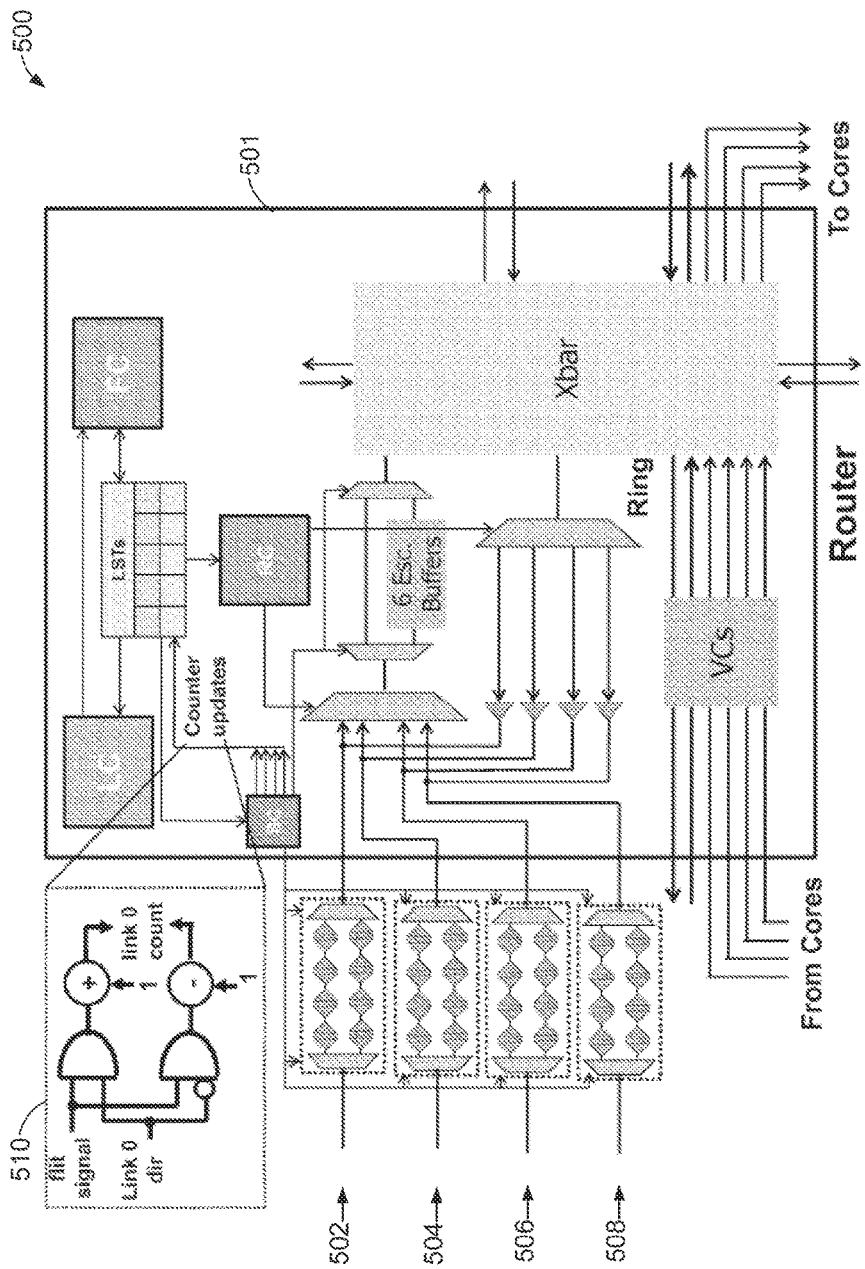
FIG. 5 illustrates an example circuit of a network-on-chip architecture.

FIG. 5 illustrates an example circuit 500 of a network-on-chip architecture. The circuit 500 may include a router 501, communication links 502, 504, 506, and 508, a counter circuit 510, a link controller "LC," a fault controller "FC," a link status table "LST," a routing controller "RC," a switching controller "SC," and escape buffers "Esc. Buffers."

The router 501 may be similar in structure and function to router 302 or router 304 of FIG. 3. The communication links 502-508 may be similar in structure and function to the communication links a-d of FIG. 3. That is, each of the communication links 502-508 may include two buffer channels comprising four MFBCs connected in series. Based on control signals received by the communication links 502-508 (e.g., MFBCs of the communication links 502-508), the communication links 502-508 may each operate in one of four modes.

Using the communication link 502 as an example, in the first mode the communication link 502 may be configured to propagate data away from the router 501 to a second router (not shown). That is, all of the MFBCs of the communication link 502 may be operating in the first mode as described above in relation to FIG. 2A.

In a second mode, the communication link 502 may be configured to propagate data to the router 501 from the second router. That is, all of the MFBCs of the communication link 502 may be operating in the second mode as described above in relation to FIG. 2B.

Each of the link controller "LC," the fault controller "FC," the routing controller "RC," and the switching controller "SC" may include suitable hardware, software, or firmware for carrying out the functions respectively attributed to these components herein. One of skill in the art will understand that the functions attributed to these components may be implemented via hardware, software, or firmware in various ways.

As data travels to or from the router 501 via the communication links 502-508, the counter circuit 510 may maintain, during a given time period, a running count of data arriving at or leaving the router 501 via the respective communication links 502-508. For example, for each datum that is received by the router 501 via the communication link 502, the counter circuit 510 may increment a variable corresponding to the communication link 502, while for each datum that leaves the router 501 via the communication link 502, the counter circuit 510 may decrement the variable corresponding to the communication link 502 (or vice versa). As another example, the counter circuit 510 may increment the variable corresponding to the communication link 502 for every bit (or other quantity of data) that is received by the router 501 via the communication link 502, and the counter circuit 510 may decrement the variable corresponding to the communication link 502 for every bit (or larger quantity of data) that is sent by the router 501 via the communication link 502.

Figure 6:
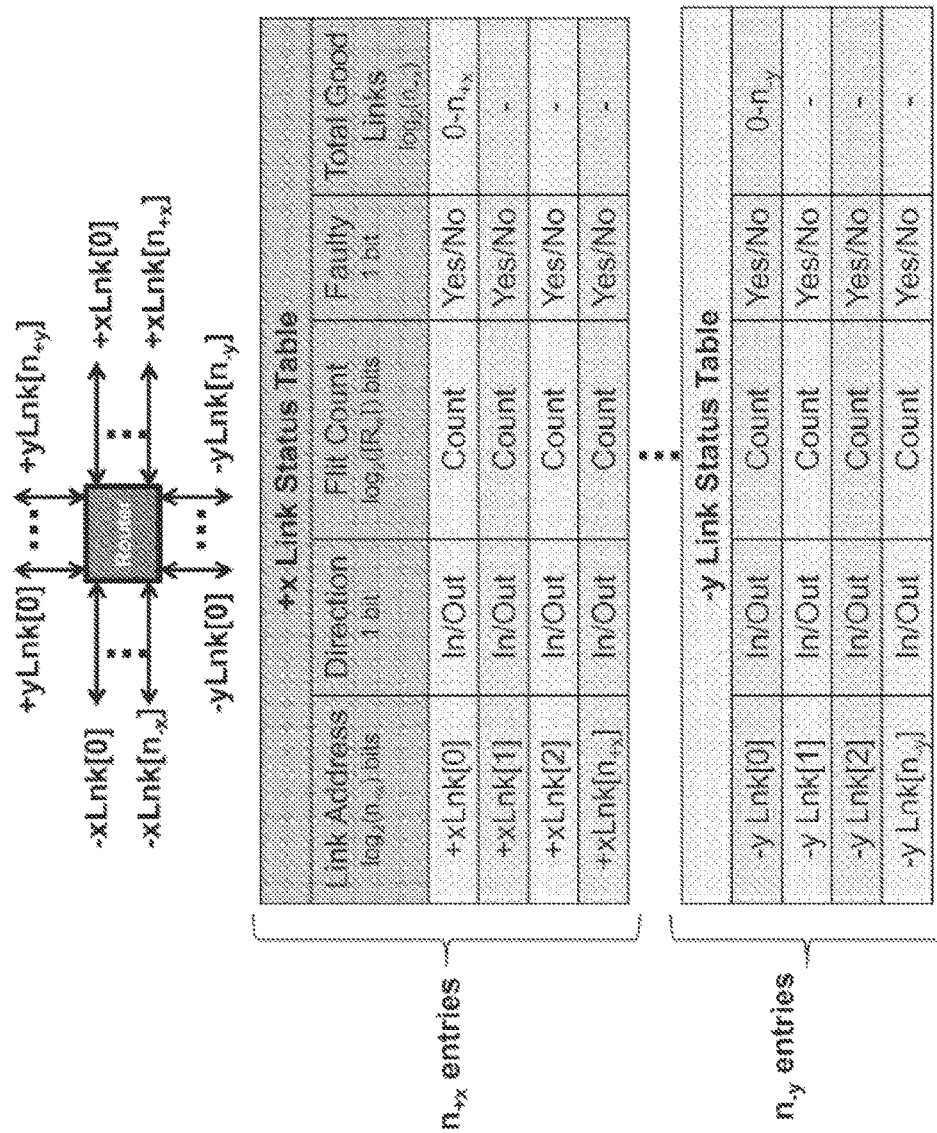
FIG. 6 is a schematic representation of an example link status table maintained for directional allocation of communication links.

The counter circuit 510 may similarly maintain respective running data counts for the communication links 504-508. The counter circuit 510 may update the link status table "LST" (shown in detail in FIG. 6) with this information. The link status table "LST" may then provide the running data counts for each communication link 502-508 to the link controller "LC." The link status table "LST" may be implemented via a non-transitory computer-readable data storage medium.

The link controller "LC" may use the running data counts for each of the communication links 502-508 to determine whether, over a given time period, a first amount of data sent by the router 501 via the communication links 502-508 is greater than a second amount of data received by the router 501 via the communication links 502-508. For example, assuming the respective running data counts for the communication links 502-508 during the given time period are +1, −2, +3, and −4, resulting in a sum of −2, the link controller "LC" determines that the first amount is greater than the second amount. Likewise, assuming the respective running data counts for the communication links 502-508 are −1, +2, −3, and +4, resulting in a sum of 2, the link controller "LC" determines that the second amount is greater than the first amount.

Figure 7:
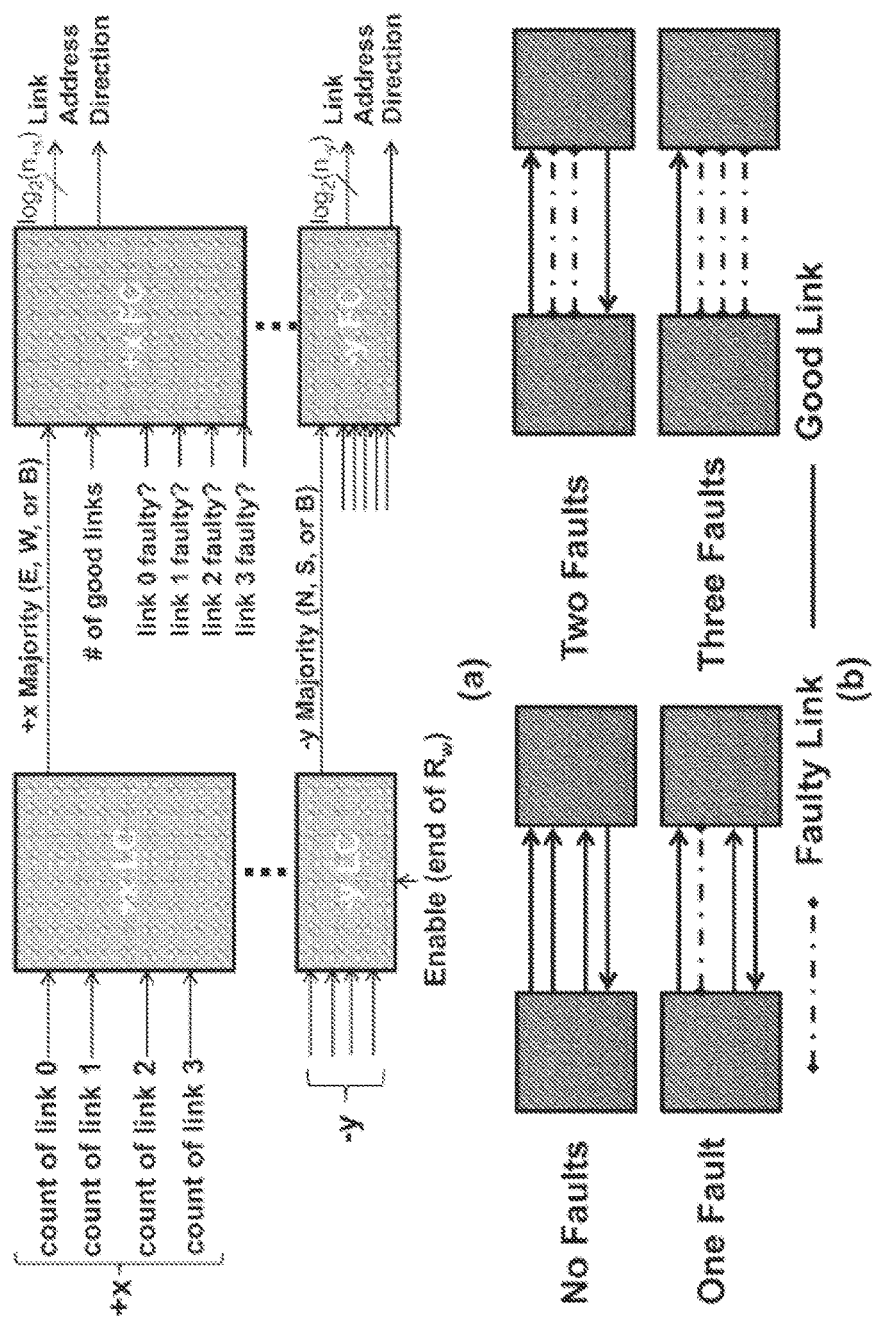
FIG. 7 illustrates example scenarios for directional allocation of communication links.

The link controller "LC," may then provide data representing the comparison of the first amount and the second amount to the fault controller "FC." The fault controller "FC" may also access the link status table "LST" to receive data indicating which of the communication links 502-508 are functioning properly and which exhibit faults. (Methods for detecting faults within communication links are well known to those of skill in the art.) As shown in FIG. 7, the fault controller "FC" may use this information to determine potentially new respective modes of operation for the communication links 502-508. The fault controller "FC" may write data indicating the new modes of operation to the link status table "LST."

Accordingly, the switching controller "SC" may access the data written to the link status controller "LST" by the fault controller "FC," and according to the accessed data, reconfigure one or more of the communication paths 502-508 by sending control signal(s) (e.g., "rev" and/or "rel") to the MFBCs of the respective communication links 502-508.

The routing controller "RC" may read the link status table "LST" to determine which mode the respective communication links 502-508 are operating in. Based on this information, the routing controller "RC" may direct various data to a particular communication link to be transmitted away from the router 501. For example, the routing controller "RC" may receive data indicating a destination of the second router. The routing controller "RC" may read the link status table "LST" determine that the communication link 502 is currently operating in the first mode, and accordingly send the data to the communication link 502 to be transmitted to the second router.

In cases where the crossbar experiences data congestion, the escape buffers "Esc. Buffers" may be used to store data incoming from the communication links 502-508 until the crossbar is able to receive data again.

Figure 8:
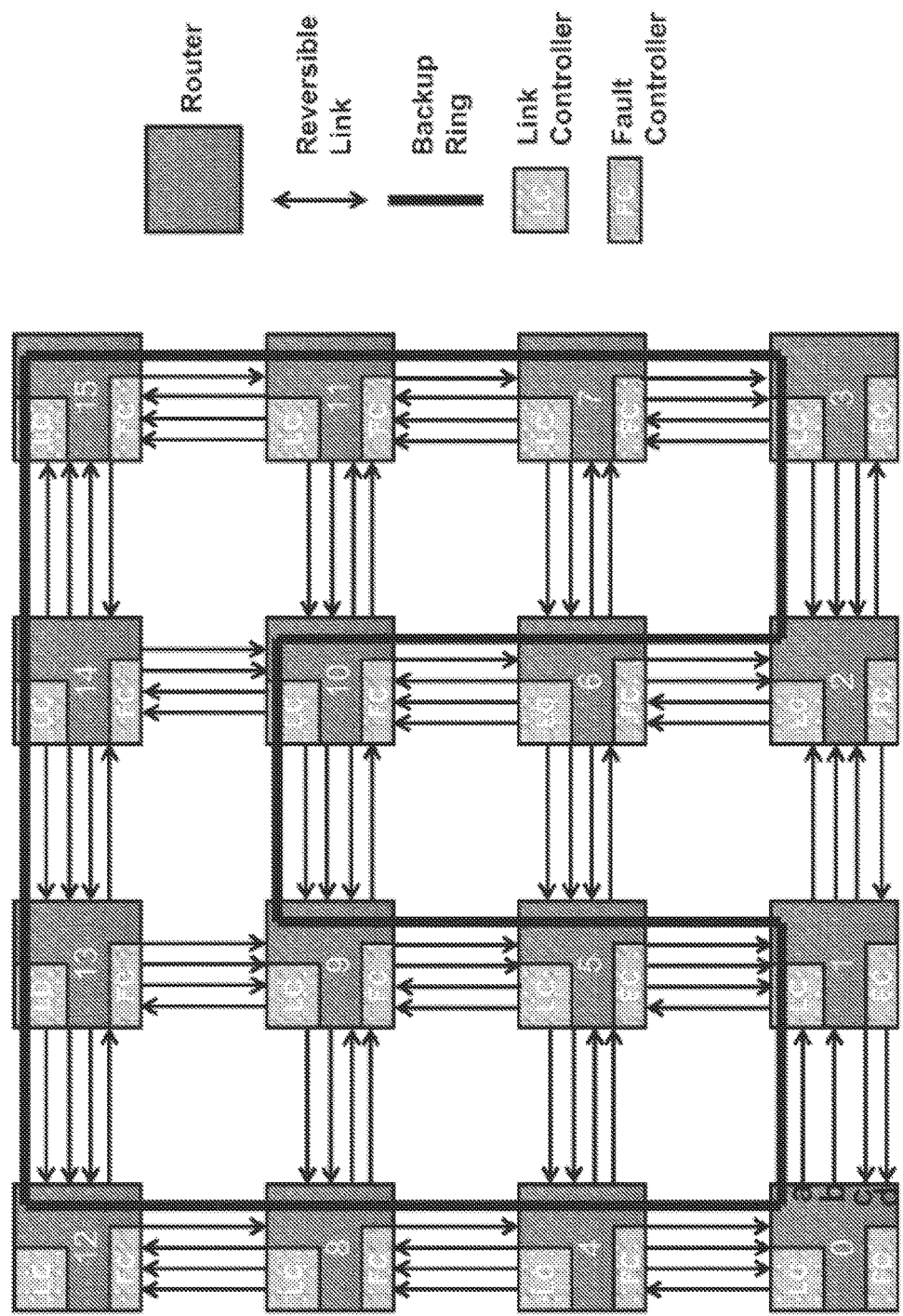
FIG. 8 illustrates example routers communicatively coupled via communication links and a backup communication ring.

As shown in FIG. 8, in addition to being communicatively coupled via communication links as described above, one or more routers may also be communicatively coupled via a backup ring. The backup ring shown in FIG. 8 serially connects the routers 0-15 via additional sets of backup communication links. For instance, the backup ring connects router 0 and router 1, router 1 and router 5, router 5 and router 9, and so on, forming a loop that ends at router 0.

By way of example, in the event that all (primary) communication links that communicatively couple router 0 and router 1 exhibit faults, data can be transferred between the router 0 and router 1 via the backup ring. For example, the backup ring may include a first backup communication link and a second backup communication link connecting router 0 and router 1. The first backup communication link may be unidirectional in that it propagates data from router 0 to router 1. The second backup communication link may only propagate data from router 1 to router 0.

Figure 9:
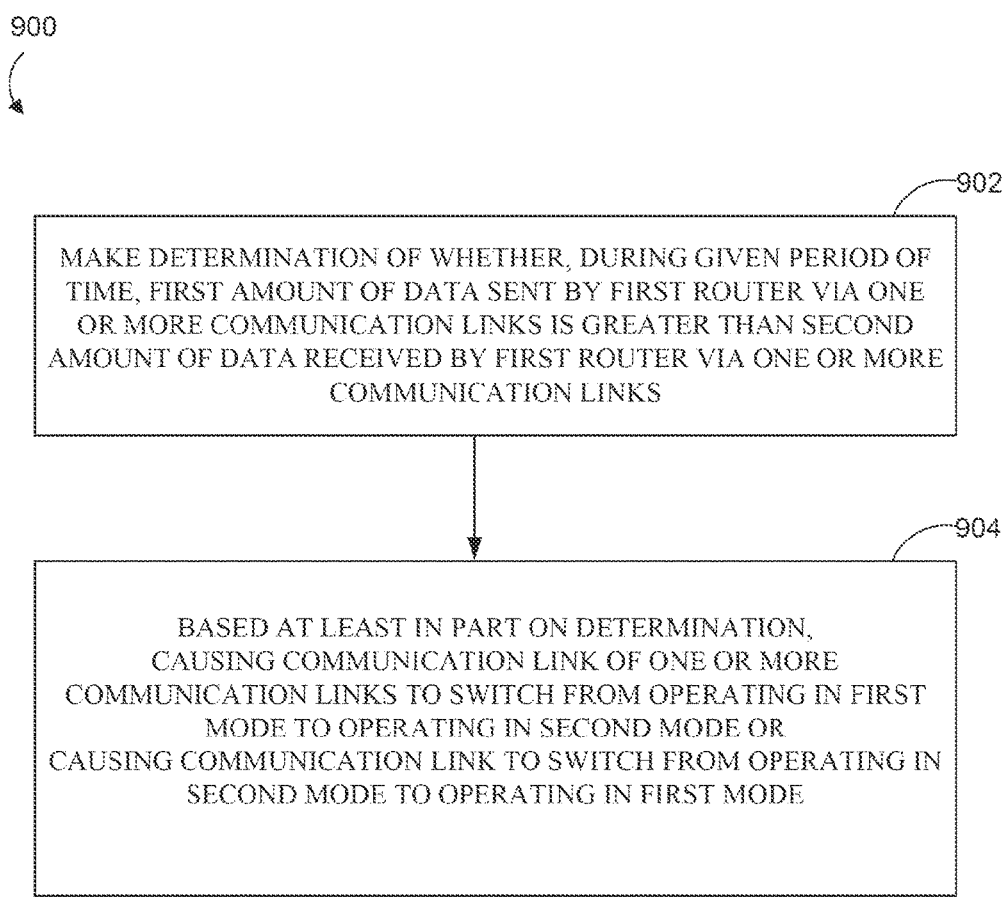
FIG. 9 is a block diagram depicting an example method.

FIG. 9 is a block diagram depicting an example method 900 for controlling one or more communication links that communicatively couple a first router of a network-on-chip architecture and a second router of the network-on-chip architecture. At block 902, the method 900 involves making a first determination of whether, during a given time period, a first amount of data sent by the first router via the one or more communication links is greater than a second amount of data received by the first router via the one or more communication links.

In some examples the communication link may be configured to operate in a first mode or a second mode. The first mode may include propagating data from the first router to the second router, and the second mode may include propagating data to the first router from the second router. For example, the link controller "LC" of FIG. 5 may access data from the link status table "LST." The accessed data may include, among other information, whether each of the communication links 502-508 was respectively operating in the first mode or the second mode during the given time period. The accessed data may also indicate how much data each of the communication links 502-508 transmitted or received during the given time period. For example, the accessed data may indicate how many bits (or other quantities of data) each of the communication links 502-508 transmitted or received during the given time period. Based on the accessed data, the link controller "LC" may determine whether, during the given time period, a first amount of data sent by the first router 501 via the communication links 502-508 is greater than a second amount of data received by the first router 501 via the communication links 502-508.

At block 904, the method 900 involves, based at least in part on the first determination, causing a communication link of the one or more communication links to switch from operating in a first mode to operating in a second mode; or causing the communication link to switch from operating in the second mode to operating in the first mode.

More specifically, the method 900 may further include determining that the first amount is greater than the second amount; and based at least in part on determining that the first amount is greater than the second amount, causing the communication link to switch from operating in the second mode to operating in the first mode. For example, initially the communication links 502-504 may be operating in the first mode and the communication links 506-508 may be operating in the second mode. Based on accessing data (e.g., "flit count" of FIG. 6) from the link status table "LST," the link controller "LC" may determine that the first amount is greater than the second amount. In response, the "LC" may send this information to the fault controller "FC" so that the fault controller "FC" updates the direction fields of the link status table "LST" accordingly. In response, the switching controller "SC" may read the link status table "LST" and cause the communication link 506 to switch from operating in the second mode to operating in the first mode. As a result, three of four communication links may be operating in the first mode to accommodate higher data traffic in the direction away from the router 501.

In this context, the method 900 may further include prior to causing the communication link to switch from operating in the second mode to operating in the first mode, causing the communication link to propagate data stored by the communication link to the first router via one or more escape buffers of the first router. For example, the communication link 506 may "flush" any data present on the communication link 506 from a first buffer channel to a second buffer channel so that the second buffer channel may transmit the flushed data to the router 501. The flushed data may be received by the escape buffers "Esc. Buffers" of the router 501.

In another example, the method 900 may further include determining that the second amount is greater than the first amount; and based at least in part on determining that the second amount is greater than the first amount, causing the communication link to switch from operating in the first mode to operating in the second mode.

For example, initially the communication links 502-504 may be operating in the first mode and the communication links 506-508 may be operating in the second mode. Based on accessing data (e.g., "flit count" of FIG. 6) from the link status table "LST," the link controller "LC" may determine that the second amount is greater than the first amount. In response, the "LC" may send this information to the fault controller "FC" so that the fault controller "FC" updates the direction fields of the link status table "LST" accordingly. In response, the switching controller "SC" may read the link status table "LST" and cause the communication link 504 to switch from operating in the first mode to operating in the second mode. As a result, three of four communication links may be operating in the second mode to accommodate higher data traffic in the direction toward the router 501.

In this context, the method 900 may further include prior to causing the communication link to switch from operating in the first mode to operating in the second mode, causing the communication link to propagate data stored by the communication link to the second router via one or more escape buffers of the second router. For example, the communication link 504 may "flush" data on the communication link 504 from a first buffer channel to a second buffer channel so that the second buffer channel may transmit the flushed data to a second router (not shown in FIG. 5). The flushed data may be received by escape buffers of the second router.

The method 900 may further include determining that a difference between the first and second amounts is less than a threshold amount; and based at least in part on determining that the difference between the first and second amounts is less than the threshold amount, causing the communication link to switch from operating in the first mode to operating in the second mode.

As an example, the communication link 502 may initially be operating in the second mode and the communication links 504-508 may be operating in the first mode. The link controller "LC" may access data from the link status table "LST" and determine based on the accessed data that the first amount of data and the second amount of data differ only by 3%, which is less than a threshold percentage of 5%. In response, the link controller "LC" may send this information to the fault controller "FC" so that the fault controller "FC" updates the direction fields of the link status table "LST" accordingly. In response, the switching controller "SC" may read the link status table "LST" and cause the communication link 504 to switch from operating in the first mode to operating in the second mode. As a result, the four communication links 502-508 may be split equally between operating in the first mode and operating in the second mode to accommodate the relatively balanced data traffic.

The method 900 may further include determining that a difference between the first and second amounts is less than a threshold amount; and based at least in part on determining that the difference between the first and second amounts is less than the threshold amount, causing the communication link to switch from operating in the second mode to operating in the first mode.

As an example, the communication link 502 may initially be operating in the first mode and the communication links 504-508 may be operating in the second mode. The link controller "LC" may determine that the first amount of data and the second amount of data differ only by 3%, which is less than a threshold percentage of 5%. In response, the link controller "LC" may cause the communication link 504 to switch from operating in the second mode to operating in the first mode. As a result, the four communication links 502-508 may be split equally between operating in the first mode and operating in the second mode to accommodate the relatively balanced data traffic.

The method 900 may further involve making a second determination of an amount of the one or more communication links that are functioning properly. In this context, causing the communication link to switch from operating in the first mode to operating in the second mode or switch from operating in the second mode to operating in the first mode may be performed, at least in part, based on the second determination.

As an example, the communication links 502-504 may be operating in the first mode, the communication link 506 may be operating in the second mode, and the communication link 508 may be exhibiting a fault. Based on accessing data (e.g., "flit count" and "faulty" of FIG. 6) from the link status table "LST," the link controller "LC" may make a determination that the second amount is greater than the first amount. In response, the "LC" may send this information to the fault controller "FC" so that the fault controller "FC" updates the direction fields of the link status table "LST" accordingly. In response, the switching controller "SC" may read the link status table "LST" and cause the communication link 504 to switch from operating in the first mode to operating in the second mode. As a result, two of the three properly functioning communication links 502-506 may be operating in the second mode to accommodate higher data traffic in the direction toward the router 501.

As another example, the communication links 502-504 may be operating in the second mode, the communication link 506 may be operating in the first mode, and the communication link 508 may be exhibiting a fault. Based on accessing data (e.g., "flit count" and "faulty" of FIG. 6) from the link status table "LST," the link controller "LC" may make a determination that the first amount is greater than the second amount. In response, the "LC" may send this information to the fault controller "FC" so that the fault controller "FC" updates the direction fields of the link status table "LST" accordingly. In response, the switching controller "SC" may read the link status table "LST" and cause the communication link 504 to switch from operating in the second mode to operating in the first mode. As a result, two of the three properly functioning communication links 502-506 may be operating in the first mode to accommodate higher data traffic in the direction away from the router 501.

The method 900 may further include determining that faults exist on each of the one or more communication links; and based on determining that faults exist on each of the one or more communication links, the first router sending data to the second router via a backup communication link. Referring to FIG. 8 as an example, the fault controller "FC" of router 0 may determine that faults exist on each of the primary communication links connecting the router 0 to the router 1. In response, the router 0 may send data to router 1 via the backup ring depicted in FIG. 8.

The method 900 may further include the first router receiving additional data from the second router via a first backup communication link, wherein the additional data indicates that a destination of the additional data is a third router of the network-on-chip architecture; and based on (i) receiving the additional data via the first backup communication link and (ii) the additional data indicating that the destination of the additional data is the third router, the first router transmitting the additional data via a second backup communication link.

For example, the router 0 of FIG. 8 may receive data from the router 1 via a first backup communication link. The data may indicate an intended destination of router 12. The router 0 may then transmit the received data to router 4, via a second backup communication link, so that router 4 may transmit the data to router 8, and router 8 may transmit the data to router 12, via another backup communication link.

The method 900 may further include determining that, of any of the one or more communication links, only the communication link is functioning properly; and based at least in part on determining that only the communication link is functioning properly: causing the communication link to operate in the first mode for a first period of time; and causing the communication link to operate in the second mode for a second period of time.

In some contexts, the first period of time is greater than the second period of time because the first amount has been determined to be greater than the second amount. Accordingly, the communication link will be caused to operate in the first mode for the first period of time and operate in the second mode for the second period of time based at least in part on determining that the first amount is greater than the second amount.

In some contexts, the second period of time is greater than the first period of time because the second amount has been determined to be greater than the first amount. Accordingly, the communication link will be caused to operate in the first mode for the first period of time and operate in the second mode for the second period of time based at least in part on determining that the second amount is greater than the first amount.

For example, the fault controller "FC" may determine that only the communication link 502 is functioning properly. As a result, the fault controller "FC" writes direction data to the link status table "LST" indicating that the communication link 502 should alternate between operating in the first mode for the first period of time and operating in the second mode for the second period of time.

The method 900 may further include accessing data indicating which of the first and second modes the one or more communication links are respectively operating in; and sending data to the second router via a given communication link indicated by the accessed data to be operating in the first mode. For example, the routing controller "RC" may access data (e.g., "direction") from the link status table "LST" indicating that communication links 502-504 are operating in the first mode and communication links 506-508 are operating in the second mode. If the routing controller "RC" is tasked with selecting a communication link for sending a given data packet to the second router (not shown in FIG. 5), the routing controller "RC" may direct the given data packet to the communication link 502 because the communication link 502 is indicated by the accessed data to be operating in the first mode.

The accessed data may further indicate that the given communication link experienced the least amount of data traffic of any of the one or more communication links during the given time period. For example, the data (e.g., "count" of FIG. 6) accessed by the routing controller "RC" may further indicate that the communication link 502 has handled less data traffic than the communication link 504 during the given time period. In this case, the routing controller "RC" may direct the given data packet to the communication link 502 because it is operating in the first mode and has handled less data traffic than the communication link 504 during the given time period.

The method 900 may further include causing a given communication link of the one or more communication links to propagate given data toward the first router; and thereafter, sending to the given communication link a signal indicating that the first router is experiencing data congestion, thereby causing the given communication link to store the given data. For example, the switching controller "SC" may send control signal(s) (e.g., "rev" and "rel") to the communication link 502 to operate in the second mode. In response, the communication link 502 may propagate data toward the router 501. Thereafter, the switching controller "SC" may receive a congestion signal from the crossbar ("xbar") of the router 501, indicating that the crossbar is not currently able to receive additional data. The switching controller "SC" may then forward the congestion signal along to the MFBCs of the communication link 502, causing the MFBCs of the communication link 502 to operate in the third mode depicted in FIG. 2. That is, the MFBCs of the communication link 502 may store data that is respectively present at each MFBC and halt propagation of data toward the router 501.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A circuit comprising;
   a first terminal;
   a second terminal;
   a three-state buffer including an input terminal and an output terminal and configured to:
      operate in a propagation mode that propagates data from the input terminal to the output terminal in response to receiving a first control signal corresponding to a first mode or a second control signal corresponding to a second mode, and
      operate in an isolation mode that electrically isolates the output terminal in response to receiving a third control signal corresponding to a third mode or a fourth control signal corresponding to a fourth mode;
   a storage module; and
   a control module configured to:
      in response to receiving the first control signal or the third control signal, couple the first terminal to the input terminal and the second terminal to the output terminal,
      in response to receiving the second control signal or the fourth control signal, couple the second terminal to the input terminal and the first terminal to the output terminal, and
      cause the circuit to operate in:
         the first mode in response to receiving the first control signal, wherein operating in the first mode comprises propagating data received by the first terminal to the second terminal,
         the second mode in response to receiving the second control signal, wherein operating in the second mode comprises propagating data received by the second terminal to the first terminal,
         the third mode in response to receiving the third control signal, wherein operating in the third mode comprises the storage module storing data received by the first terminal, and
         the fourth mode in response to receiving the fourth control signal, wherein operating in the fourth mode comprises the storage module storing data received by the second terminal.

2. The circuit of claim 1, wherein:
the circuit is part of a communication link that communicatively couples a first router of a network-on-chip architecture with a second router of the network-on-chip architecture,
operating in the first mode further comprises:
the first terminal receiving first data transmitted by the first router, and
the second terminal transmitting the first data to the second router;
operating in the second mode further comprises:
the second terminal receiving second data transmitted by the second router, and
the first terminal transmitting the second data to the first router;
operating in the third mode further comprises:
the first terminal receiving third data transmitted by the first router, and
the storage module storing the third data; and
operating in the fourth mode further comprises:
the second terminal receiving fourth data transmitted by the second router, and
the storage module storing the fourth data.

3. The circuit of claim 1, wherein:
coupling the first terminal to the input terminal comprises providing a conductive path between the first terminal and the input terminal; and
coupling the second terminal to the output terminal comprises providing a conductive path between the second terminal and the output terminal.

4. The circuit of claim 1, wherein:
coupling the first terminal to the output terminal comprises providing a conductive path between the first terminal and the output terminal; and
coupling the second terminal to the input terminal comprises providing a conductive path between the second terminal and the input terminal.

5. The circuit of claim 1, wherein the control module comprises a switch that is configured to:
open to electrically isolate the first terminal from the input terminal; and
close to create a conductive path between the first terminal and the input terminal.

6. The circuit of claim 1, wherein the control module comprises a switch that is configured to:
open to electrically isolate the second terminal from the output terminal; and
close to create a conductive path between the second terminal and the output terminal.

7. The circuit of claim 1, wherein the control module comprises a switch that is configured to:
open to electrically isolate the second terminal from the input terminal; and
close to create a conductive path between the second terminal and the input terminal.

8. The circuit of claim 1, wherein the control module comprises a switch that is configured to:
open to electrically isolate the first terminal from the output terminal; and
close to create a conductive path between the first terminal and the output terminal.

9. The circuit of claim 1, wherein storing the data received by the first terminal comprises the output terminal storing the data received by the first terminal.

10. The circuit of claim 1, wherein storing the data received by the second terminal comprises the output terminal storing the data received by the second terminal.

11. A method performed by a circuit including a first terminal and a second terminal, the method comprising:
operating a three-state buffer including an input terminal and an output terminal in a propagation mode that propagates data from the input terminal to the output terminal in response to receiving a first control signal corresponding to a first mode or a second control signal corresponding to a second mode;
operating the three-state buffer in an isolation mode that electrically isolates the output terminal in response to receiving a third control signal corresponding to a third mode or a fourth control signal corresponding to a fourth mode;
in response to receiving the first control signal or the third control signal, coupling the first terminal to the input terminal and the second terminal to the output terminal;
in response to receiving the second control signal or the fourth control signal, coupling the second terminal to the input terminal and the first terminal to the output terminal;
in response to receiving the first control signal, propagating data received by the first terminal to the second terminal;
in response to receiving the second control signal, propagating data received by the second terminal to the first terminal;
in response to receiving the third control signal, storing data received by the first terminal; and
in response to receiving the fourth control signal, storing data received by the second terminal.

12. The method of claim 11, wherein the circuit is part of a communication link that communicatively couples a first router of a network-on-chip architecture with a second router of the network-on-chip architecture, the method further comprising:
receiving first data transmitted by the first router at the first terminal;
in response to receiving the first control signal, transmitting the first data to the second router from the second terminal;
receiving second data transmitted by the second router at the second terminal;
in response to receiving the second control signal, transmitting the second data to the first router from the first terminal;
receiving third data transmitted by the first router at the first terminal;
in response to receiving the third control signal, storing the third data in a storage module of the circuit;
receiving fourth data transmitted by the second router at the second terminal; and
in response to receiving the fourth control signal, storing the fourth data in the storage module.

13. The method of claim 11 wherein:
coupling the first terminal of the circuit to the input terminal of the three-state buffer comprises providing a conductive path between the first terminal and the input terminal; and
coupling the second terminal of the circuit to the output terminal of the three-state buffer comprises providing a conductive path between the second terminal and the output terminal.

14. The method of claim 11 wherein:
coupling the first terminal of the circuit to the output terminal of the three-state buffer comprises providing a conductive path between the first terminal and the output terminal; and coupling the second terminal of the circuit to the input terminal of the three-state buffer comprises providing a conductive path between the second terminal and the input terminal.

15. A method for controlling a plurality of reversible unidirectional communication links including one or more forward communication links that communicatively couple data from a first router of a network-on-chip architecture to a second router of the network-on-chip architecture, and one or more backward communication links that communicatively couple data from the second router to the first router, the method comprising:
   determining whether, during a given time period, a first amount of data sent by the first router via the one or more forward communication links is greater than a second amount of data received by the first router via the one or more backward communication links; and
   in response to determining the first amount of data is greater than the second amount of data, switching at least one of the one or more backward communication links from operating as a backward communication link to operating as a forward communication link;
   wherein operating as the forward communication link comprises propagating data from the first router to the second router, and
   wherein operating as the backward communication link comprises propagating data to the first router from the second router.

16. A circuit of a network-on-chip architecture, the circuit comprising:
   a first router and a second router; and
   a plurality of reversible unidirectional communication links including one or more forward communication links that communicatively couple data from the first router to the second router, and one or more backward communication links that communicatively couple data from the second router to the first router, wherein the circuit is configured to:
      determine whether, during a given time period, a first amount of data sent by the first router via the one or more forward communication links is greater than a second amount of data received by the first router via the one or more backward communication links; and
      in response to determining the first amount of data is greater than the second amount of data, switch at least one of the one or more backward communication links from operating as a backward communication link to operating as a forward communication link;
   wherein operating as the forward communication link comprises propagating data from the first router to the second router, and
   wherein operating as the backward communication link comprises propagating data to the first router from the second router.

* * * * *